United States Patent Office
2,842,527
Patented July 8, 1958

2,842,527

VINYL ETHER DERIVATIVES OF AMIDOPHOSPHATE AND AMIDOTHIOPHOSPHATE ESTERS, THEIR POLYMERS AND PROCESSES FOR PREPARING THEM

Sidney Melamed, Philadelphia, Pa., assignor to Rohm & Haas Company, Philadelphia, Pa., a corporation of Delaware No Drawing. Application October 6, 1954
Serial No. 460,757

19 Claims. (Cl. 260—80.3)

This invention relates to new vinyl ethers of N-(hydroxyalkyl)- and substituted N-(hydroxyalkyl)-amidophosphates and amidothiophosphates and to their preparation.

It is an object of the invention to provide new monomeric and polymeric compounds having valuable properties for various uses as more particularly defined hereinafter. Another object is to provide methods for preparing the new compounds.

The new vinyl ethers have the structure of one of the Formulas I, II, and III:

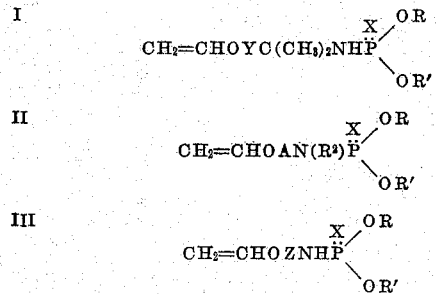

where R and R' (1) are separate groups selected individually from the class consisting of alkyl (including cyclohexyl) or alkenyl groups of 1 to 18 carbon atoms, aryl, haloaryl, alkaryl or aralkyl groups of 6 to 19 carbon atoms, or (2) together form a single saturated alkylene group of 2 to 3 carbon atoms forming with the —O—P—O— linkage a 5- or 6-sided heterocyclic ring;

$R^2$ is an alkyl group of 1 to 18 carbon atoms, benzyl or cyclohexyl;

A is an alkylene group of 2 to 18 carbon atoms having at least two carbon atoms in a chain extending between the ether oxygen and nitrogen so that this oxygen and nitrogen atom are not both directly attached to the same carbon;

X may be oxygen or sulfur;

Y is an alkylene group of 1 to 7 carbon atoms;

Z is a cyclohexylene or a 4-to-10-carbon atom alkylene group having at least 4 carbons in a linear chain extending between the ether oxygen and nitrogen.

In general, when R and R' are separate groups, they may be different within the limits of the above definition.

The compounds of this invention are prepared by the reaction of a di-substituted chlorophosphate or chlorothiophosphate of Formula IV:

with one of the amines of the Formulas V, VI, and VII respectively:

V   $CH_2=CHOYC(CH_3)_2NH_2$
VI  $CH_2=CHOANHR^2$
VII $CH_2=CHOZNH_2$ where the various substituents have the same definitions as recited above.

Compounds of Formula IV that may be used in the practice of this invention are di-substituted chlorophosphates or chlorothiophosphates where the substituents R and R' may be dimethyl, diethyl, dibutyl, diisobutyl, di-2-ethylhexyl, didodecyl, dioctadecyl, ethylene, trimethylene, propylene, dicyclopentyl, dicyclohexyl, diallyl, diocta- decenyl, di-11-undecenyl, dibenzyl, di-butylbenzyl, di-octylbenzyl, di-alpha-methyl benzyl, di-(p-chlorobenzyl), diphenethyl, diphenyl, di-(p-chlorophenyl), di-(2,4-dichlorophenyl), di-(o-bromophenyl), di-(p-nitrophenyl), di-alpha-naphthyl, di-tolyl, di-butylphenyl, di-t-butylphenyl, di-t-octylphenyl, di-nonylphenyl, di-(dodecylmethylbenzyl), di-dodecylphenyl, or di-(p-phenylphenyl).

Amines of Formulas V, VI, and VII that may be used in the preparation of the compounds of this invention include the following:

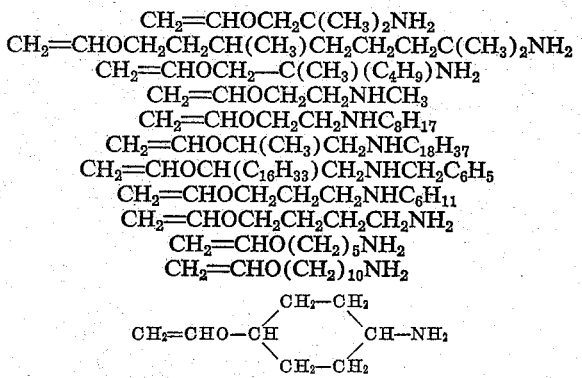

The compounds of the invention may be prepared by the condensation of the chlorophosphates or thiophosphates of Formula IV with one of the amines of Formulas V, VI, or VII, in the presence of an acceptor for the hydrogen chloride evolved, at a temperature in the range of $-10°$ C. to 100° C. or more, in the presence or absence of a solvent, such as benzene, toluene, petroleum ether, acetonitrile, ether or the like and in the presence or absence of water as an additional solvent. As acceptors for the hydrogen chloride, there may be used excess of the reacting amine, a tertiary amine such as triethylamine, pyridine, quinoline or dimethylbenzylamine or an inorganic base such as sodium hydroxide, potassium carbonate, sodium bicarbonate, lithium hydroxide and the like. When inorganic bases are employed as acceptors, it is preferable to use water in conjunction with an organic solvent. When amines are used as acceptors, one preferred method employs strictly anhydrous conditions. For some reactions the preferred temperature range is $-10$ to 30° C., while for others a range of 50° to 100° C. or more is preferred. The products may be isolated in the usual manner as by stripping, distilling, crystallizing, selective adsorption and the like.

The products are useful in a variety of ways. They are useful as insecticides and fungicides. They are useful as solvents, as plasticizers, as additives to lubricating oils, as textile chemicals, as flame retardants, in the modification of resins, as corrosion inhibitors and in dispersant and detergent compositions.

The compounds of this invention may be polymerized by acid or free-radical initiators to form polymeric materials useful in a variety of applications. Of particular interest are the homopolymers prepared by the use of free-radical initiators such as azo catalysts of which alpha,alpha'-azodiisobutyronitrile or dimethyl azodiisobutyrate are typical examples. These polymers are useful as insecticides, as flame-proofing agents for textiles, paper and other combustible materials, as additives to lubricating oils to improve pour-point, viscosity index, detersiveness and oxidation- and corrosion-resistance.

The polymers so formed may be hydrolyzed to give poly-(amidophosphoric) and poly-(amidothiophosphoric acids) which are useful as chelating agents and ion-selective agents in the preparation of exchange membranes. These compositions are also of interest as additives to solutions or melts of fiber and film-forming resins and plastics and impart valuable anionic properties useful in dyeing and in other ways to the coagulated, regenerated or formed films and fibers.

The homopolymers may be formed by polymerization in bulk, in solution, in suspension or in emulsion with amounts of catalysts of 0.1 to 10% or more in the presence of inert gases such as nitrogen if desired. The polymers may be isolated and purified by conventional methods such as by drying, stripping, or precipitating. The hydrolysis of the polymers may be accomplished in either acidic or basic media, preferably at elevated temperatures of 50° to 100° C. A preferred procedure employs homogeneous reaction conditions such as may be obtained by the use of acetic acid-water mixtures or alcohol-water mixtures and an acid, such as hydrochloric acid or a basic catalyst, such as sodium hydroxide. The polymeric acids may be isolated by precipitation, concentration, dialysis and like methods.

Important embodiments of this invention are the polymers obtained by interpolymerizing 5 to 95 mole percent of the compounds of this invention with 95 to 5% of one or more other ethylenically unsaturated compounds, and particularly with vinylidene compounds having a terminal methylene group attached by a double bond to the adjacent carbon. Examples of such compounds are the vinylidene halides such as vinyl chloride, 1,1-dichloroethylene, vinyl fluoride, 1,1-difluoroethylene; acrylic, haloacrylic, and alkacrylic acids, esters, nitriles and amides such as methyl acrylate, ethyl methacrylate, acrylic acid, butyl α-chloroacrylate, methoxymethyl methacrylate, chloroethyl acrylate, β-diethylaminoethyl methacrylate, acrylonitrile, acrylamide, methacrylonitrile, methacrylamide; vinyl esters such as vinyl acetate, vinyl chloroacetate, vinyl butyrate, vinyl laurate; aldehydes and ketones such as methyl vinyl ketone, acrolein; N-vinyl compounds such as vinyl phthalimide, vinyl carbazole, N-vinyl pyrrolidone, N-vinyl-N-methylacetamide; unsaturated ethers such as vinyl butyl ether, 2-formamidoethyl vinyl ether; vinylidene hydrocarbons such as isobutylene, 1,3-butadiene, 2-chlorobutadiene; other monomers such as vinylpyridine, dimethyl maleate, tetrafluoroethylene; polyvinylidene compounds such as divinylbenzene, trivinylbenzene, ethyleneglycoldiacrylate, ethyleneglycol divinyl ether, N,N-methylene-bis-acrylamide and the like. Two or more of the vinylidene compounds listed above may be copolymerized with the unsaturated ethers of this invention.

The compounds of this invention are particularly useful as monomers in that they may be polymerized, even as homopolymers, to products of high molecular weight such as degrees of polymerization of 100 to 1000 or more. In copolymerization they do not exhibit excessive chain-transfer or chain-degradative properties and may thus be incorporated into copolymers of very high molecular weight extending up to one million or more. Such properties are important particularly in the use of these materials in the preparation of fibers, films, castings and the like.

In addition the compounds exhibit unusual stability to heat, ultraviolet light or traces of oxygen which usually contribute to the instability and storage difficulties of common ethylenically unsaturated monomeric materials.

One preferred class of such interpolymers are those derived from acrylic monomers such as methyl acrylate, butyl acrylate, butyl methacrylate and the like and compounds of Formulas I, II, or III. The copolymers are those that contain up to 40% of an amidophosphate or thiophosphate compound and at least 60% of one or more acrylic monomers. These compounds are useful in the treatment of textiles for flameproofing and imparting flame-resistance. Similar interpolymers containing 60% or more of alkyl acrylates and methacrylates where the alkyl groups range from eight to eighteen carbons are oil-soluble and useful as additives to lubricating oils imparting detersive and corrosion-resistant properties.

Equally useful interpolymers may be obtained if, in place of the acrylic monomers mentioned above, corresponding vinyl esters be used such as vinyl acetate or vinyl butyrate in the first part for treating textiles or vinyl laurate or vinyl stearate in the second part for addition to lubricating oils.

The copolymerization of the ethers of this invention in amounts of 0.5 to 10 or even 20% with acrylonitrile alone or in conjunction with other monomers to give interpolymers containing at least 70% acrylonitrile gives products which can be readily formed into strong fibers and films capable of orientation as by stretching or drawing. Surprisingly such interpolymers may be readily dyed in contrast to corresponding homopolymers or copolymers not containing these unsaturated ethers as comonomers. They also show reduced flammability.

Still another useful category of interpolymers are those prepared from the unsaturated ethers disclosed herein and divinyl compounds such as divinylbenzene, ethyleneglycoldiacrylate, or the divinyl ether of ethyleneglycol. These copolymers containing 2 to 20% and preferably 5 to 10% of the divinyl component are insoluble and may be prepared as beads or other fine particles. Hydrolysis with acid or base results in the preparation of insoluble amidophosphoric acids useful as ion-exchange resins.

In the following examples, which are illustrative of the invention, the parts given, unless otherwise specified, are parts by weight.

*Example 1*

A mixture of 29 grams (0.25 mole) of 2-amino-2-methylpropyl vinyl ether and 150 ml. of toluene is added to a slurry prepared from 20.7 grams (0.15 mole) of potassium carbonate and 25 ml. of water. The resultant system is stirred, cooled to 5° C. and treated slowly with 43 grams (0.25 mole) of diethyl chlorophosphate. The mixture is stirred at 5 to 10° C. for two hours; the layers are separated and the organic layer is washed with water and dried. Concentration of the toluene solution gives 43 grams of product as a light yellow oil of the composition diethyl N-(1,1-dimethyl-2-vinyloxyethyl)-amidophosphate,

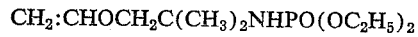

It contained by analysis 12.6% phosphorus, 5.5% nitrogen and 0.6% chlorine. The calculated values are 12.35% phosphorus, 5.58% nitrogen and no chlorine. Completely chlorine-free material is obtained by careful distillation at pressures less than 1 mm. Hg.

*Example 2*

By the procedure of example one there is effected a condensation between 50.5 g. (0.5 mole) of 2-(N-methylamino)ethyl vinyl ether and 94.6 grams (0.55 mole) of diethyl chlorophosphate in the presence of 41.4 grams of potassium carbonate, 150 ml. of toluene and 100 ml. of water. The product is isolated by distillation as a light yellow liquid, B. P. 104 to 111°/0.7 to 0.75 mm. Hg. It contains by analysis 5.4% nitrogen and 14.5% phosphorus corresponding in structure to diethyl N-methyl-N-vinyloxyethylamidophosphate,

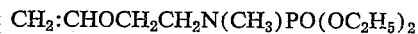

*Example 3*

There is condensed by the procedure of Example 1, 129 grams of 5-aminopentyl vinyl ether and 144 grams of dimethyl phosphoryl chloride in the presence of 110 grams of sodium carbonate, 250 ml. of benzene and 125 ml. of water. The product is isolated as a light yellow oil corresponding in composition to dimethyl N-(5-vinyloxypentyl)amidophosphate, $$CH_2{:}CHO(CH_2)_5NHPO(OCH_3)_2$$

and containing 5.8% nitrogen and 13.6% phosphorus.

There is substituted for the aminopentyl vinyl ether an equivalent molar quantity of 10-aminodecyl vinyl ether to give $$CH_2{:}CHO(CH_2)_{10}NHPO(OCH_3)_2$$

Both products undergo addition polymerization by procedures illustrated by subsequent Examples 11 to 21.

*Example 4*

By the procedure of Example 1 there is condensed 50.5 grams of 2-(N-methylamino)ethyl vinyl ether and 100 grams of diallyl chlorophosphate in the presence of 55 grams of sodium carbonate, 150 ml. of ether and 75 ml. of water. The product is a yellow, highly-refractive oil of the structure, diallyl N-methyl-N-vinyloxyethylamido phosphate, $$CH_2{:}CHOCH_2CH_2N(CH_3)PO(OCH_2CH{=}CH_2)_2$$

*Example 5*

(a) There is condensed at 30 to 70° C. one mole of 2-(N-cyclohexylamino)ethyl vinyl ether and one mole of dicyclohexyl chlorophosphate in the presence of 1.1 moles of potassium carbonate, 100 ml. of water and 250 ml. of toluene. The product, obtained after stripping the solvent, is a viscous, yellow oil corresponding to dicyclohexyl N-cyclohexyl-N-vinyloxyethylamidophosphate.

This product is compatible with polyvinyl chloride resins and is useful as a plasticizer showing good low-temperature flexibility and resistance to spew. It may be used in amounts up to 50% alone or in combination with other polyvinyl chloride plasticizer materials.

(b) There is substituted in place of the dicyclohexyl chlorophosphate of part (a) above dibenzyl chlorophosphate. The resultant condensate has the structure corresponding to dibenzyl N-cyclohexyl-N-vinyloxyethylamidophosphate.

(c) The procedure of part (a) hereof is followed except that the dicyclohexyl chlorophosphate is replaced with di-dodecylbenzyl chlorophosphate. The resulting di-dodecylbenzyl N - cyclohexyl - N - vinyloxyethylamidophosphate is polymerizable to an oil-soluble polymer.

*Example 6*

(a) A condensation of molar equivalents of diphenyl chlorophosphate and 2-(N-methylamine)-1-methylethyl vinyl ether is effected in 2 to 3 hours at 70 to 100° C. in the presence of 0.6 mole of sodium carbonate, water and toluene. The product is a viscous oil corresponding in composition to diphenyl N-methyl-N-(2-vinyloxypropyl)-amidophosphate, $$CH_2{:}CHOCH(CH_3)CH_2N(CH_3)PO(OC_6H_5)_2$$

which forms valuable polymers with azo catalysts and copolymers by procedures illustrated by Examples 12 to 21.

(b) The chlorophosphate of part (a) is wholly replaced with di(p-chlorophenyl) chlorophosphate. The product is $$CH_2{:}CHOCH(CH_3)CH_2N(CH_3)PO(OC_6H_4Cl)_2$$

The product is useful as a plasticizer for vinyl chloride polymers. It is also useful in amounts of 10 to 25% in combination with a free radical initiator such as di-t-butyl peroxide as an additive to vinyl chloride plastigels giving a non-extractable plasticizer on curing.

(c) Similarly N-methylaminoethyl vinyl ether and di-(nonylphenyl) chlorophosphate are condensed by the procedure of part (a) to give $$CH_2{:}CHOCH_2CH_2N(CH_3)PO(OC_6H_4C_9H_{19})_2$$

The product is useful as an antioxidant and corrosion inhibitor when added in amounts of 0.5 to 5% to lubricating oils for internal combustion engines.

*Example 7*

A mixture of 5.8 grams (0.5 mole) of 2-(N-ethylamino)-ethyl vinyl ether, 150 ml. of toluene, 100 ml. of water and 41.4 grams of potassium carbonate is stirred at 10° C. and treated slowly with 80 grams (0.5 mole) in dimethyl chlorothiophosphate in a period of one hour. The mixture is stirred for two hours at 25 to 50° C., the layers are separated and the organic layer washed well with water, dried and concentrated to give a reddish oil as the product. This material contains 5.5% nitrogen, 13.4% phosphorus and 14.0% sulfur corresponding to the structure dimethyl N-ethyl-N-vinyloxyethylamido-thiophosphate, $$CH_2{:}CHOCH_2CH_2N(C_2H_5)PS(OCH_3)_2$$

Similarly a condensation is effected between 2-(N-benzylamino)ethyl vinyl ether and diphenyl chlorothiophosphate at 50° to 80° C. to give diphenyl N-benzyl-N-vinyloxyethylamidothiophosphate, $$CH_2{:}CHOCH_2CH_2N(C_6H_5CH_2)PS(OC_6H_5)_2$$

*Example 8*

Condensation is effected by the procedure of Example 2 between 2-(N-methylamino)-1-hexadecylethyl vinyl ether and dioctadecyl bromophosphate. The product is a waxy solid corresponding to dioctadecyl N-methyl-N-(2-vinyloxyoctadecyl)amidophosphate, $$CH_2{:}CHOCH(C_{16}H_{33})CH_2N(CH_3)PO(OC_{18}H_{37})_2$$

A similar product is obtained by substituting didodecyl bromophosphate in the above reaction to give $$CH_2{:}CHOCH(C_{16}H_{33})CH_2N(CH_3)PO(OC_{12}H_{25})_2$$

These materials are useful as additives to lubricating oils to improve resistance to oxidation and reduce corrosiveness. Amounts of 0.1 to 5.0% of these products based on the oil may be used and mixtures of the two are more effective than each alone. Polymers and copolymers obtained from these products are oil-soluble and useful as oil additives.

*Example 9*

(a) In place of the amine of Example 1 there is substituted 7-amino-3,7-dimethyloctyl vinyl ether. The product obtained is formulated as follows:

$$CH_2{:}CHOC_{10}H_{20}NHPO(OC_2H_5)_2$$

(b) Again in place of the amine of Example 1 there is used 4-aminocyclohexyl vinyl ether to give diethyl N-(4-vinyloxycyclohexyl)amidophosphate.

*Example 10*

The amine of Example 2 is condensed with O,O-ethylene chlorophosphate by the procedure of Example 2 to give as produst O,O'-ethylene N-methyl-N-vinyloxyethylamidophosphate, $$CH_2{:}CHOCH_2CH_2N(CH_3)P\begin{matrix}O\\\diagup\\\diagdown\end{matrix}\begin{matrix}O{-}CH_2\\|\\O{-}CH_2\end{matrix}$$

Polymers and copolymers may be prepared from any of the products of Examples 1 to 10 by any of the conventional methods, such as by solution, emulsion, bulk or suspension polymerization. The following examples are illustrative thereof.

Example 11

(a) Five grams of the product of Example 1,

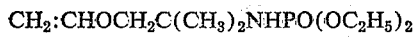

and 0.25 gram of dimethyl $\alpha,\alpha'$-azodiisobutyrate are mixed and heated at 75° C. for sixteen hours in a closed vessel in an atmosphere of nitrogen. The polymer is purified by precipitation with petroleum ether in which the monomer is soluble. Vacuum drying gives 3 grams of viscous resin, a 60% conversion, readily soluble in methanol, acetone or benzene.

(b) A similar reaction is performed using 0.1 gram of $\alpha,\alpha'$-azodiisobutyronitrile under the same conditions. A 20% conversion to polymer is obtained.

(c) A mixture of the vinyl ether (5 grams) of part (a) hereof, dimethyl azodiisobutyrate (0.25 gram) and dimethylformamide (5 grams) are mixed and allowed to react at 75° C. for 24 hours. The polymer is isolated by precipitation with water; a conversion of 40% is realized.

(d) A solution in methanol of the polymer of part (a) is applied to cotton fabric at 5% by weight of the fabric and dried. The resultant material is markedly flame-resistant and does not support combustion after removal from the flame.

Example 12

A mixture of 10 parts of diethyl N-(1,1-dimethyl-2-vinyloxyethyl)amidophosphate, 90 parts of distilled vinyl acetate, 100 parts of toluene and 2 parts of dimethyl azodiisobutyrate is heated at 80° C. in an atmosphere of nitrogen for 16 hours. The polymer is freed of monomer by stripping at reduced pressure to give a rubbery polymer soluble in acetone and dimethylformamide. It contains both nitrogen and phosphorus.

A 20% solution of the polymer in methanol is heated to reflux and then an equivalent of 25% aqueous sodium hydroxide is slowly added. The resultant copolymer contains vinyl alcohol units, approximately 5 mole percent of amidophosphoric acid units corresponding to the original vinyl ether, and a small proportion of residual ester units. The product is useful as a thickener for synthetic and natural latices as the sodium or ammonium salt. It it also useful as a dispersant.

Example 13

A terpolymer is prepared from 53 parts of lauryl methacrylate, 45 parts of cetyl methacrylate and 2 parts of dicyclohexyl N-methyl-N-vinyloxyethylamidophosphate in toluene using 1.5 parts of benzoyl peroxide as the initiator. The resultant clear, viscous solution is miscible with an oil of SAE 30 grade extracted Mid-Continent stock to which it imparts an improvement in the viscosity index rating, improved detergency and resistance to oxidative degradation.

Example 14

An emulsion is prepared from 92 parts of butyl acrylate and 8 parts of diethyl N-methyl N-vinyloxyethylamidophosphate in 140 parts of water with the aid of a t-octyl-phenoxypolyethoxyethanol containing about 10 oxyethylene units as an emulsifier. The mixture is catalyzed with 0.5 part of ammonium persulfate and 1.2 parts of diethylenetriamine and allowed to react at 40° to 50° C. for 4 hours.

The resultant emulsion is applied at 2% solids to a Botany wool fabric, dried and heated at 115° C. for 10 minutes. The fabric retains its original soft hand but shows less than 10% shrinkage after 300 minutes of laundering compared to an untreated control which shows 50% shrinkage.

Example 15

A mixture of 45 parts of acrylonitrile and 7.5 parts of dimethyl N-methyl-N-vinyloxyethylamidophosphate, 75 parts of dimethylformamide and 1.3 parts of azodiisobutyronitrile was heated in an atmosphere of nitrogen for 6 hours at 85° C. The resultant viscous solution gives clear films on casting. The polymer isolated by precipitation from water contains phosphorus indicating the presence in the polymer molecules of addition polymerized vinyloxyalkylamidophosphate. Fibers formed by spinning the above solutions have good strength, dye well with acid or basic dyes and exhibit excellent scour fastness.

Example 16

A mixture of 10 parts of vinyl butyl ether and 2 parts of diethyl N(1,1-dimethyl-2-vinyloxyethyl)amidophosphate is cooled to —60° C. and treated with 0.1 part of boron trifluoride. An exotherm is noted, and the temperature is allowed to rise to room temperature. The residual rubbery polymer contains both nitrogen and phosphorus and is a copolymer composed of units of the above monomers.

Example 17

A mixture of 5 parts of dimethyl N-methyl-N-vinyloxyethylamidophosphate, 100 parts of pure benzene and 0.2 part of di-tertiary-butyl peroxide is pressured with ethylene and heated at 130° to 140° C./800 to 1000 atm. pressure for 3 hours. The copolymer obtained contains both nitrogen and phosphorus and is largely composed of polymerized ethylene units.

Example 18

By the procedure of Example 11(a) there is prepared a homopolymer of dimethyl N-methyl-N-vinyloxyethylamidothiophosphate.

Example 19

By the procedure of Example 13, except that the amidophosphate is replaced with 2 parts of the amidothiophosphate of Example 18, there is prepared an oil-soluble polymer which imparts good antioxidant properties when added in the range of 2 to 10% to standard automotive lubricating oils.

Example 20

The product of Example 4, diallyl N-methyl-N-vinyloxyethylamidophosphate (100 parts) and di-tert-butyl peroxide (2 parts) are mixed and polymerized at 120° to 130° C. for 40 hours in a glass mold. The resultant clear polymer is hard, transparent and solvent-resistant.

Example 21

A mixture of 10 parts of dimethyl N-methyl-N-vinyloxyethylamidophosphate, 1 part of ethylenegylcol dimethacrylate, and 0.3 part of dimethyl azodiisobutyrate is heated at 75° C. for 20 hours. The resultant hard resin is ground well and refluxed in a solution of 20 parts of water, 80 parts of ethanol and 5 parts of sodium hydroxide for 48 hours to effect hydrolysis. The resultant resin is collected, washed well and dried. It is useful as an ion-exchange resin.

Example 22

A mixture of 97% by weight of methyl methacrylate, 3% by weight of dimethyl N-methyl-N-vinyloxyethylamidophosphate and 0.01% by weight of benzoyl peroxide is cast between polished glass plates surrounded by a flexible dam as in 2,154,639, heated at 90° C. for about 15 minutes and 75° C. for 24 hours to effect copolymerization. A clear, transparent sheet having reduced flammability as compared to a poly(methyl methacrylate) sheet is obtained.

The compounds of this invention are also useful pesticidal agents. For example, the products of Examples 1, 2, 4, and 10 are useful contact insecticides against aphids, mites and similar insects. The products of Example 7 show contact activity against milkweed bugs and are also fungitoxic in their action.

It is to be understood that changes and variations may be made from the above details of the description without departing from the spirit and scope of the invention as defined by the appended claims.

We claim:

1. A composition comprising a compound selected from the group consisting of the compounds having the Formulas I, II, and III

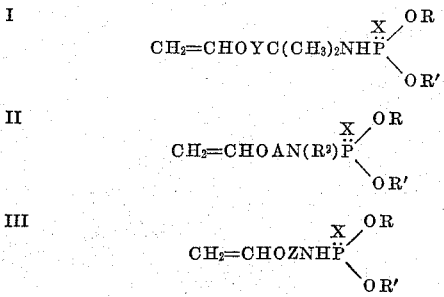

where R and R', when not directly connected together, are separate groups selected individually from the group consisting of cyclohexyl, alkyl and alkenyl groups having 1 to 18 carbon atoms; and aryl, haloaryl, alkaryl and aralkyl groups having 6 to 19 carbon atoms, and R and R', when directly connected together, form a single saturated alkylene group of 2 to 3 carbon atoms forming with the —O—P—O— linkage a 5- to 6-sided heterocyclic ring.

$R^2$ is selected from the group consisting of an alkyl group of 1 to 18 carbon atoms, benzyl and cyclohexyl;

A is an alkylene group of 2 to 18 carbon atoms having at least two carbon atoms in a chain extending between the ether oxygen and nitrogen so that this oxygen and nitrogen atom are not both directly attached to the same carbon;

X is selected from the group consisting of oxygen and sulfur;

Y is an alkylene group of 1 to 7 carbon atoms;

Z is selected from the group consisting of cyclohexylene groups and 4-to-10-carbon atom alkylene groups having at least 4 carbons in a linear chain extending between the ether oxygen and nitrogen.

2. A composition comprising a compound having the Formula I as defined in claim 1.

3. A composition comprising a compound having the Formula II as defined in claim 1.

4. A composition comprising a compound having the Formula III as defined in claim 1.

5. A composition comprising diethyl N-(1,1-dimethyl-2-vinyloxyethyl)amidophosphate.

6. A composition comprising diethyl N-methyl-N-vinyloxyethylamidophosphate.

7. A composition comprising dimethyl N-(5-vinyloxypentyl)amidophosphate.

8. A composition comprising dicyclohexyl N-cyclohexyl-N-vinyloxyamidophosphate.

9. A composition comprising dimethyl N-ethyl-N-vinyloxyethylamidothiophosphate.

10. A composition comprising a polymer of a compound selected from the group consisting of the compounds having the formulas I, II, and III as defined in claim 1.

11. A composition comprising a polymer of diethyl N-(1,1-dimethyl-2-vinyloxyethyl)amidophosphate.

12. A composition comprising a polymer of diethyl N-methyl-N-vinyloxyethylamidophosphate.

13. A composition comprising a polymer of dimethyl N-(5-vinyloxypentyl)amidophosphate.

14. A composition comprising a polymer of dicyclohexyl N-cyclohexyl-N-vinyloxyamidophosphate.

15. A composition comprising a polymer of dimethyl N-ethyl-N-vinyloxyethylamidothiophosphate.

16. A method comprising reacting a compound having the Formula IV with an amine selected from the group consisting of the amines having the Formulas V, VI, and VII

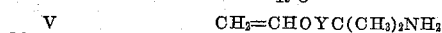

wherein R, R', X, Y, A, $R^2$, and Z are as defined in claim 1.

17. A method comprising polymerizing a compound selected from the group consisting of the compounds having the Formulas I, II, and III as defined in claim 1 in the presence of a free radical polymerization catalyst.

18. A method comprising copolymerizing a compound selected from the group consisting of the compounds having the Formulas I, II, and III as defined in claim 1 with another ethylenically unsaturated comonomer in the presence of a free radical catalyst.

19. A method comprising polymerizing a compound selected from the group consisting of the compounds having the Formulas I, II, and III as defined in claim 1 in the presence of a free radical polymerization catalyst and then hydrolyzing at least part of the ester groups in the polymer.

References Cited in the file of this patent

UNITED STATES PATENTS

| | | |
|---|---|---|
| 2,151,380 | Flint et al. | Mar. 21, 1939 |
| 2,574,518 | Walter | Nov. 13, 1951 |